US012356895B2

(12) United States Patent
Weller et al.

(10) Patent No.: US 12,356,895 B2
(45) Date of Patent: Jul. 15, 2025

(54) BALING APPARATUS

(71) Applicant: AGCO Corporation, Duluth, GA (US)

(72) Inventors: Lucas Andrew Weller, Hesston, KS (US); Richard Lee Alexander, Hesston, KS (US); James Kraus, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 714 days.

(21) Appl. No.: 17/661,892

(22) Filed: May 3, 2022

(65) Prior Publication Data

US 2022/0354059 A1    Nov. 10, 2022

Related U.S. Application Data

(60) Provisional application No. 63/266,915, filed on Jan. 19, 2022, provisional application No. 63/224,482, filed on Jul. 22, 2021.

(30) Foreign Application Priority Data

May 4, 2021    (GB) ..................................... 2106331

(51) Int. Cl.
  *A01F 15/07*    (2006.01)
  *A01F 15/08*    (2006.01)
  *A01F 15/10*    (2006.01)

(52) U.S. Cl.
  CPC ........ *A01F 15/071* (2013.01); *A01F 15/0833* (2013.01); *A01F 2015/072* (2013.01); *A01F 2015/076* (2013.01); *A01F 2015/108* (2013.01)

(58) Field of Classification Search
  CPC .... A01F 15/071; A01F 15/0833; A01F 15/07; A01F 2015/072; A01F 2015/076; A01F 2015/08
  See application file for complete search history.

(56) References Cited

U.S. PATENT DOCUMENTS 5,319,899 A    6/1994 Jennings et al.
5,581,974 A    12/1996 Underhill et al.
(Continued)

FOREIGN PATENT DOCUMENTS

EP    1776860 A1    4/2007
GB    2440324 A    1/2008

OTHER PUBLICATIONS

UK Intellectual Property Office, Search report for UK Priority Application No. GB2106331.8, dated Oct. 29, 2021.

*Primary Examiner* — Mohammed S. Alawadi (57) ABSTRACT

A round baler having a baling chamber, a wrapping material reservoir, a feed apparatus having an actuator, the feed apparatus configured to convey a wrapping material from the wrapping material reservoir to the baling chamber, a cutting apparatus moveable between a retracted position allowing free movement of the wrapping material and an advanced position to cut the wrapping material, and a braking apparatus for applying a braking force on a roll of wrapping material installed in the wrapping material reservoir, and an actuator for controlling operation of the feed apparatus and the cutting apparatus. The round baler further comprises a tensioning element connecting the actuator to the braking apparatus to control a down force exerted on the roll of wrapping material and so control the tension in the wrapping material.

16 Claims, 7 Drawing Sheets

(56) References Cited

U.S. PATENT DOCUMENTS

| | | | |
|---|---|---|---|
| 2010/0236190 A1 | 9/2010 | Paillet et al. | |
| 2012/0073455 A1* | 3/2012 | Vandamme | B65B 27/125 |
| | | | 100/49 |
| 2016/0183474 A1* | 6/2016 | Thoreson | B65B 57/04 |
| | | | 53/399 |
| 2017/0049058 A1* | 2/2017 | Eubanks | A01F 15/0715 |
| 2020/0323145 A1* | 10/2020 | Lebeau | A01F 15/0715 |

* cited by examiner

BALING APPARATUS

CROSS-REFERENCE TO RELATED APPLICATIONS

This application claims priority to UK Application No. GB2106331.8, filed May 4, 2021, and U.S. Provisional Application No. 63/266,915, filed 19 Jan. 2022, each of which are incorporated herein by reference in their entirety. U.S. Provisional Application No. 63/224,482, was filed 22 Jul. 2021, requesting a retroactive foreign filing License related to US Inventorship for GB2106331.8.

FIELD OF THE INVENTION

The present invention relates to a baling apparatus and in particular to a baling apparatus for producing round bales in which the wrapping material is introduced into the baling chamber by way of a duckbill applicator.

BACKGROUND

Cut crop is picked up by a baler and directed into a baling chamber where a bale is formed. Before ejecting the formed bale from the baler it is desirable to bind or wrap the bale prior to ejection from the baling chamber in order to maintain the integrity of the formed bale as it is ejected from the baler.

For this purpose the baler is further provided with a roll of wrapping material and a feed apparatus configured to dispense/convey wrapping material from the roll of wrapping material to the baling chamber. The wrapping material may take any suitable form, though net wrap is a common wrapping material. A cutting apparatus moveable between a retracted position allowing free movement of the wrapping material and an advanced position to cut the wrapping material when the formed bale has been sufficiently wrapped in the wrapping material is also provided. It has also been found necessary to provide a braking apparatus to apply a braking force on the roll of wrapping material as the wrapping material is dispensed from the roll of wrapping material.

In known balers separate actuators to control the operation of the feed apparatus and the braking apparatus have been provided.

There are a variety of different grades of net wrap marketed by various manufacturers of net wrap for use in round balers. While Original Equipment Manufacturers can recommend the use of a certain specification of net wrap (or other wrapping material), whether or not an operator will choose to accept the recommendation is always unknown. Additionally, the rolls of net wrap are sold in differing lengths, resulting in rolls of differing weight. Each of these factors produces variability when using net wrap in the baler. During the wrapping of a bale with net wrap there are a few key characteristics that must take place for a successful start, unspooling, and cut of the net wrap and one of those is tension on the net wrap. The tension on the net wrap can make it more or less difficult to start, cut and unspool, but mainly to start and cut. Ideally, less tension is desired during the start and a lot of tension during the cut, but there are a variety of different ways to perform this task.

SUMMARY OF THE INVENTION

According to a first aspect of the present invention, a round baler comprises a baling chamber,
a wrapping material reservoir,
a feed apparatus having an actuator, the feed apparatus configured to convey a wrapping material from the wrapping material reservoir to the baling chamber,
a cutting apparatus moveable between a retracted position allowing free movement of the wrapping material and an advanced position to cut the wrapping material, and
a braking apparatus for applying a braking force on a roll of wrapping material installed in the wrapping material reservoir, and
an actuator for controlling operation of the feed apparatus and the cutting apparatus wherein the round baler further comprises a tensioning element connecting the actuator to the braking apparatus.

This has as an advantage that the tensioning element is able to control a down force exerted on the roll of wrapping material by the braking apparatus and so control the tension in the wrapping material.

Preferably, the tensioning element comprises an extensible tensioning element. More preferably the tensioning element comprises a first elastically deformable element and a second inextensible element.

Preferably, at the commencement of a wrapping operation, the actuator is in a first position such that the braking element exerts a first braking force on a roll of wrapping material installed in the wrapping material reservoir, during feeding of wrapping material into the baling chamber the actuator is in a second position such that the braking element exerts a second braking force lower than the first braking force on the roll of wrapping material, and when wrapping material is being cut the actuator is in a third position such that the braking element exerts a third braking force higher than the first braking force on the roll of wrapping material installed in the wrapping material reservoir.

Preferably the baler further comprises a guide element between the actuator and the braking apparatus by which the tensioning element is directed from the actuator to the braking apparatus.

Preferably the braking apparatus comprises a lever adapted to pivot about pivot axis. More preferably the guide element is located at lower than the braking apparatus pivot axis.

Preferably the guide element takes the form of a bounded region such as a bracket or eyelet. More preferably the guide element takes the form of a grooved bearing or pulley.

Preferably the baler further comprises a sensor configured to detect the size of the bale being formed in the baling chamber.

More preferably when the size of the bale being formed in the baling chamber reaches a predetermined size, the actuator adopts a position to advance the cutting apparatus from the retracted position towards an intermediate position between the advanced and retracted positions.

Preferably the actuator is electric, hydraulic or mechanical.

According to a second aspect of the present invention, a baling apparatus comprises an agricultural vehicle and a round baler according to the first aspect of the invention.

Preferably the baling apparatus is provided with a controller. More preferably the controller receives signals for determining progress of the wrapping operation and generates signals to control operation of the actuator. More preferably, the signals for determining progress of the wrapping operation may represent the time of operation of a wrapping operation or the number of rotations of the baling chamber during the wrapping operation.

According to a third aspect of the present invention, a method of wrapping a round bale using a round baler according to the first aspect of the present invention, the round baler having a roll of wrapping material installed in the wrapping material reservoir, comprises the steps of the actuator adopting a first position such that the braking element exerts a first braking force on the roll of wrapping material during commencement of the wrapping operation, the actuator adopting a second position such that the braking element exerts a second braking force lower than the first braking force on the roll of wrapping material during feeding of the wrapping material into the baling chamber, and the actuator adopting a third position such that the braking element exerts a third braking force higher than the first braking force on the roll of wrapping material when cutting the wrapping material.

This has as an advantage that the same actuator, whether it be electrical, hydraulic, or mechanical, may be used to control the braking force on the roll of wrapping material. By variable, it is meant mean that the system will provide a different amount of braking at the start of the wrapping cycle versus the cutoff function of the cycle. Additionally, the invention also provides a different amount of brake force in relation to the size (diameter) of the roll of wrapping material.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel. Reference to height is to the distance of the element to the ground with the apparatus on a level surface.

The invention has particular application to a round baler in which the roll of wrapping material is supported on a pan or by way of a spindle system during dispense. In the illustrated embodiment support by way of a pan type system is shown.

A round baler 2 is designed to be towed behind an agricultural vehicle 3. The round baler 2 includes a baling chamber 4 (an edge of which is shown in FIGS. 1,4,7 and 10). The baling chamber 4 may be of the fixed or variable variety. A fixed diameter baling chamber is shown in the illustrated embodiment. A wrapping material inlet 6 is defined between two of the rollers 8,10 forming the baling chamber 4. It will be understood that the rollers 8,10 are supported for driven rotation in a typical fashion.

Cut crop is introduced into the baling chamber, where the accumulated cut crop is rotated to create a formed bale.

The baler 2 is further provided with a roll 12 of wrapping material located in a reservoir or storage location 20. A feed apparatus is configured to convey wrapping material from the roll 12 of wrapping material to the baling chamber 4 to allow for wrapping of the formed bale. A cutting apparatus is also provided, moveable between a retracted position allowing free movement of the wrapping material and an advanced position to cut the wrapping material when the formed bale has been sufficiently wrapped in the wrapping material. A braking apparatus is also provided to apply a braking force on the roll 12 of wrapping material as the wrapping material is dispensed from the roll 12 of wrapping material in order that tension can be introduced to the wrapping material.

It will be understood that the baler comprises a frame 14 to which the various elements are in practice mounted.

In the illustrated embodiment, the roll 12 of wrapping material is supported on tray 22 provided on a support 26 connected to the baler frame 14. The storage location 20 further includes a lip 24 over which the wrapping material is guided as it is dispensed from the storage location 20. The support 26 is provided with a lower wrapping material guide 28 extending across the baler 2. In use, a free end of the roll 12 of the wrapping material is directed under the lower wrapping material guide 28 having passed over the lip 24.

The support 26 further incudes a braking element 30. The braking element 30 is in the form of a frame comprising first and second side members 32 connected by cross members. The braking element includes a handle 34. The braking element 30 is mounted for pivoting movement to the support 26 by way of a pivot bar 36. The braking element 30 further includes rollers 38 extending across the braking element 30 in the region of the handle 34. The rollers 38 are supported within suitable mountings for free rotation with respect to the rest of the handle 30.

A pivoting duck bill applicator 40 is mounted on the baler frame 14. The duck bill applicator 40 comprises a frame having left and right hand substantially L-shaped side members 42 designed in use to allow passage of the wrapping material between them. The duck bill applicator 40 is connected to the baler frame 14 for movement around a pivot axis 44 by way of a bar extending through upper ends of the L-shaped side members 42. The distal end of the duck bill applicator is provided with a duck bill 46 comprising opposing plates and a protruding tongue. In the ready position of FIG. 10, it can be seen that the wrapping material is held between the opposing plates, with a free end of the wrapping material supported on and extending a short amount from the tongue.

Figure 10:
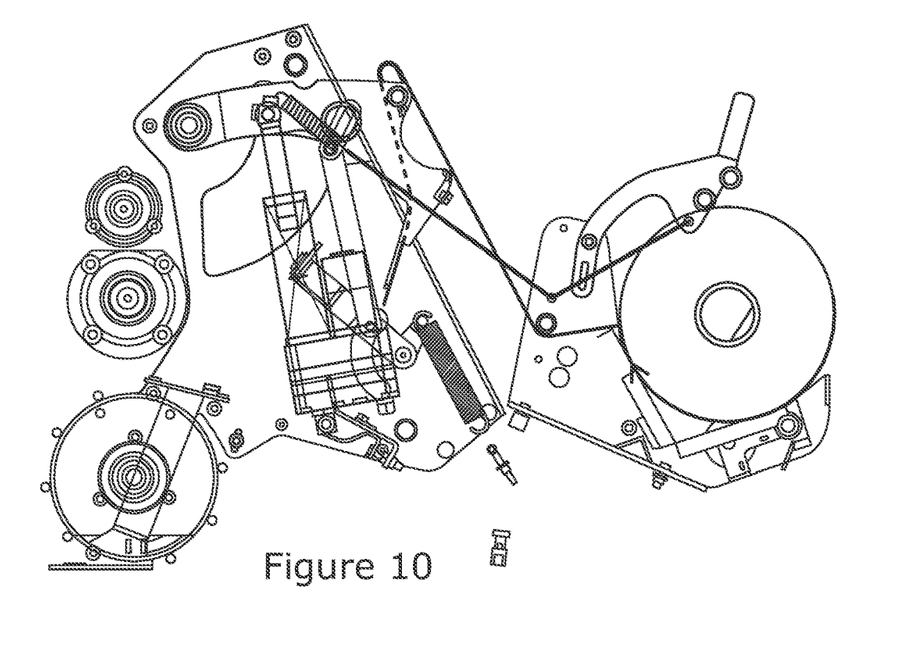
FIG. 10 shows a schematic side view of elements of a baler in accordance with the invention, the elements being in a fourth position in which the roll of wrapping material is relatively unconsumed.
Figure 11:
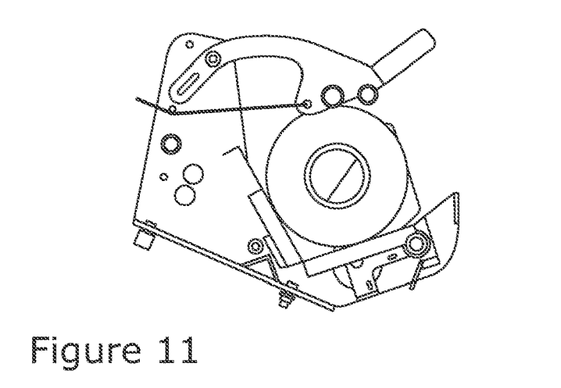
FIG. 11 shows a schematic side view of the wrapping material support and braking device of FIG. 10, in which the roll of wrapping material is approximately half consumed.
Figure 12:
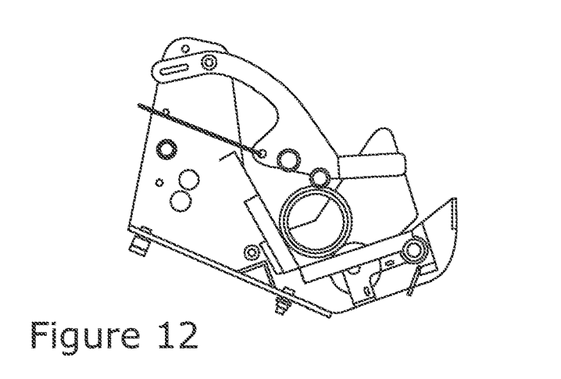
FIG. 12 shows a schematic side view of the wrapping material support and braking device of FIG. 10, in which the roll of wrapping material is almost completely consumed.
Figure 13:
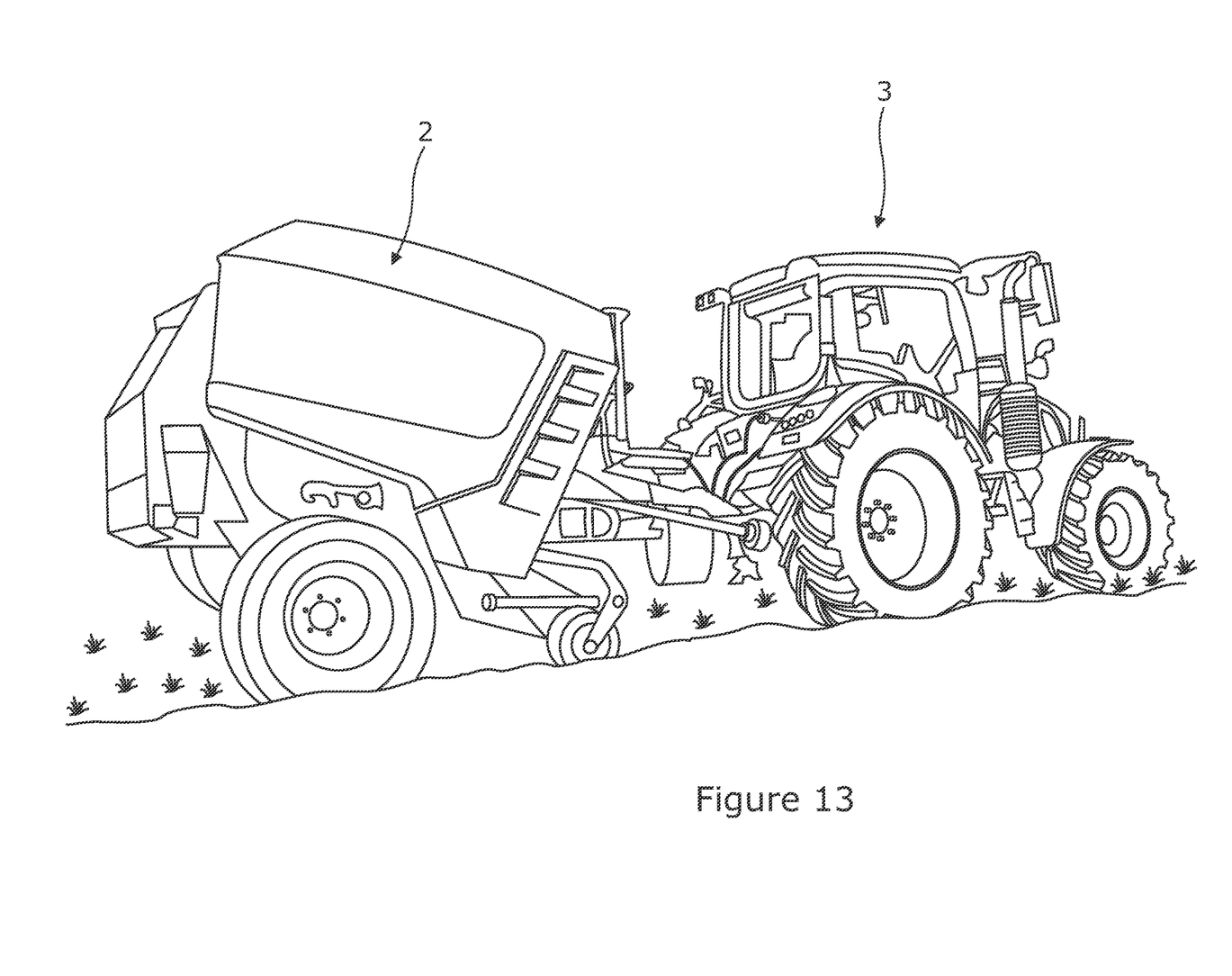
FIG. 13 shows a schematic side view of a round baler and an agricultural vehicle.
Figure 14:
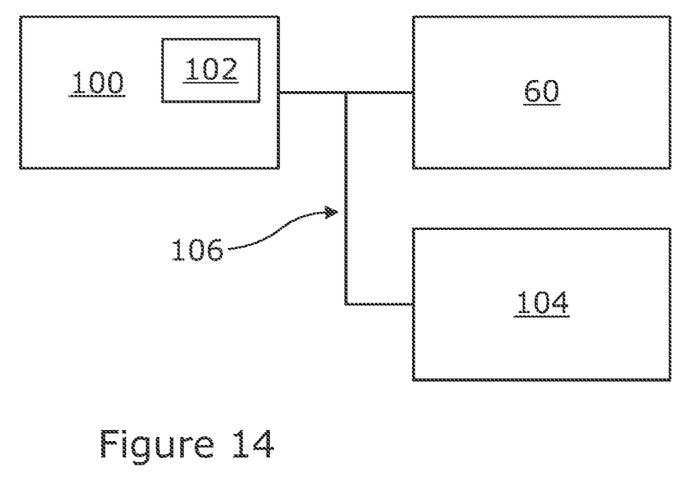
FIG. 14 shows a schematic view of electronic components for use with the present invention.

As best seen in FIG. 10, a central outer region of the L-shaped side members 42 is connected by a cross bar 50 supporting an upper wrapping material guide bar 54. A central inner region is provided at one side with an outwardly directed pin 56.

Figure 15:
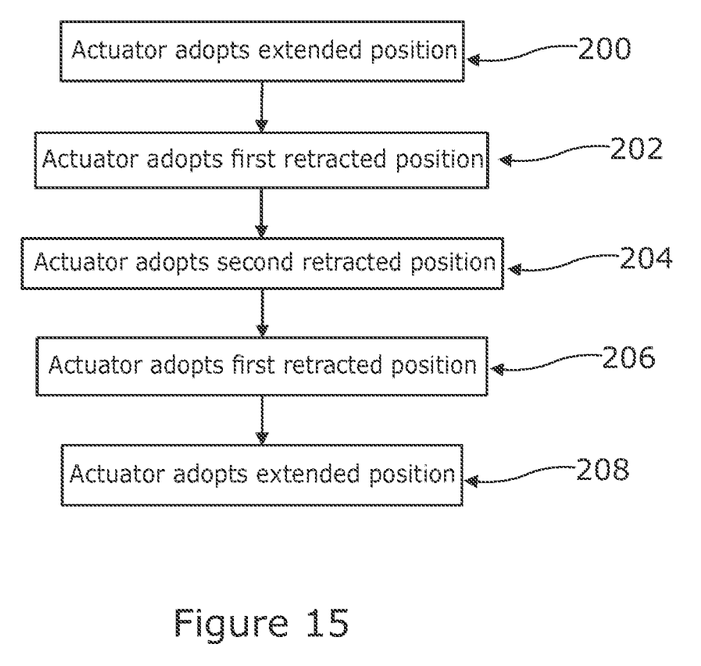
FIG. 15 shows a flow chart illustrating the steps of operation of the present invention.

An actuator 60 is provided to one side of the baler frame. The actuator 60 is mounted for pivoting movement on an actuator support 62 provided on the baler frame. A distal end of the actuator 60 is provided with a mounting 64 connecting the distal end of the actuator 60 to one or both L-shaped side members 42 (for example by a bar running between the L-shaped members 42). The mounting 64 is located to run to (or across) a part of the L-shaped member(s) 42 between the pivot axis 44 and the central portion of the L-shaped member(s) 42. In the 'ready' position of FIG. 10, the actuator 60 is in a first extended position (step 200, FIG. 15).

A tensioning element 70 is provided between the distal end of the actuator 60 and the braking element 30. A first end of the tensioning element 70 is conveniently connected to the mounting 64 and a second end of the tensioning element 70 is conveniently connected to a mounting point 76 provided on the braking element 30. The mounting point 76 is provided on one of the side members 32 below the rollers 38. The tensioning element 70 comprises a first elastic part and a second inelastic part. Conveniently, the first elastic part comprises a spring element 72 connected at one end to the mounting 64. Conveniently, the inelastic part comprises a chain or cable 74 connected at a first end to a second end of the first elastic part and at a second end to the mounting point 76. The cable 74 may be of any suitable material. A path of the tensioning element between the mounting 64 and the braking element 30 is constrained by a guide element 78 provided on the support 26.

The guide element 78 may take any convenient form. It may take the form of a U-shaped guide piece through which the inelastic part of the tensioning element runs or a pulley mounted to the support 26 around which the inelastic part of the tensioning element runs. Alternatively, the guide element 78 may take the form of an eyelet through which the inelastic part of the tensioning element runs.

A biased cutting element 80 is also provided mounted for pivoting movement about a pivot bar 82 extending across the baler. The biased cutting element 80 comprises a frame having side elements connected at a first end by a cutting knife 84. A biasing element 86, such as spring, is provided between a mounting point 88 provided on the baler frame 14 and a second end of the biased cutting element 80.

A connecting element 90 is provided between the duck bill applicator 80 and the biased cutting element 80 to one side of these elements. A first end of the connecting element 90 is secured to the pivot bar 82 supporting the cutting element 80. The ends of the pivot bar 82 are constrained for movement within arcuate channels 94 defined in the baler frame 14. A second end of the connecting element 90 is angled with respect to a main body portion of the connecting element 90. The second end is provided with a linear channel 92. The outwardly directed pin 56 is located within the linear channel 92.

The actuator 60 is conveniently operated by an electronic control unit 100. The electronic control unit has access to a memory unit 102. The memory unit 102 may take any suitable form and is in electronic communication with the electronic control unit 100. The memory unit 102 is adapted to store, in any suitable manner such as a database or look up table, reference values as described below.

The electronic control unit 100 is also in electronic communication with a bale size sensor 104.

Conveniently signals between the electronic components are provided by way of a suitable data communication network 106 such as one compliant with the ISOBUS standard (a network in conformance to ISO 11783).

The electronic control unit 100 may conveniently comprise a single processor located on the baler or its functions may be split between a first processor located on the baler and one or more additional processors located on an agricultural vehicle towing the baler, the additional processor(s) being in electronic communication with the first processor.

In the 'ready' position of FIG. 10 a relatively unused roll 12 of wrapping material can be seen. A free end of the roll 12 of wrapping material has been guided over the lip 24, under the lower wrapping material guide 28 and introduced to the duck bill applicator 40. The free end of the wrapping material has been guided over the upper wrapping material guide bar 54 and into the duck bill 46 where the wrapping material is loosely held in place by the opposing plates. A small portion of the free end of the wrapping material extends from the duck bill 46.

The tensioning element 70 acts on the braking element 70, urging the braking element 30 to rotate about the pivot bar 36 so that at least one of the rollers 38 exerts a downward force on the roll 12 of wrapping material. This downward force restrains the speed of rotation of the roll 12 of wrapping material and this braking effect tensions the wrapping material as it is drawn from the roll 12 of wrapping material.

In operation the electronic control unit 100 receives signals from the bale size sensor indicative of the size of the formed bale. When the electronic control unit determines that a desired bale size has been achieved, for example by comparing the signals with values stored in the memory unit 102, the actuator 60 is operated by the electronic control unit 100 causing the actuator 60 to contract from the extended position (FIG. 10) to a first retracted position (FIG. 1) (step 202, FIG. 15).

This has a number of effects. Firstly, the mounting 64 is moved downwards causing the pivoting duck bill applicator 40 to pivot clockwise (as shown in the FIGS. 1, 4, 7 and 10) around the pivot axis 44, so that the duck bill 46 is moved toward into the wrapping material inlet 6. Secondly the connecting element 90 is moved downward causing displacement of pivot bar 82 and also rotation of the cutting element 80 about the pivot bar 82. This movement of the duck bill applicator 40 reduces the separation of the upper wrapping material guide bar 54 and the lower wrapping material guide 28 so reducing the tension in the wrapping material.

In order to move the duck bill 56 into the wrapping material inlet 6, the actuator 60 is then operated by the electronic control unit 100 to contract to a second (fully) retracted position (FIG. 4) (step 204). This movement also causes the actuator to pivot about the actuator support 62. This causes further rotation of the duck bill applicator 40 about pivot axis 44 urging the duck bill 46 into the wrapping material inlet 6.

In this way, a free end of the wrapping material is introduced into the baling chamber 4, such that as the formed bale within the baling chamber 4 is rotated by the driven rollers, the wrapping material is caught between the rotating bale and the baling chamber, initially between the formed bale and driven roller 10, and drawn into the baling chamber 4 to wrap the rotating bale.

The movement of the actuator 60 also causes the cutting element 80 to be further driven clockwise about the pivot bar 82 as the connecting element 90 is further displaced.

With the actuator in the second retracted position, the tensioning element 70 causes the least braking force on the roll 12 of wrapping material.

Once the wrapping material is being drawn from the reservoir 20 under the action of the rotating formed bale the duck bill 46 can be removed from the wrapping material inlet 6. To achieve this, the actuator 60 is operated causing it to return to the first retracted position (FIG. 7) (step 206). This causes the cutting element 80 to be moved anticlockwise and the cutting knife 84 moved away from the wrapping material. The movement of the duck bill applicator 40 also causes movement of the wrapping material guide bar 54 so as to increase the path length between the reservoir 20 and the wrapping material inlet 6 thereby increasing the tension in the wrapping material during wrapping. This also causes the actuator 60 to be rotated back about the actuator support 62 to its previous position.

With the actuator 60 in the first retracted position, the tensioning element 70 causes the braking element 30 to exert a reduced force on the roll 12 of wrapping material.

Sensors 108 in electrical communication with the electronic control unit 100 provide signals for determining progress of the wrapping operation. When sufficient wrapping material has been drawn into the baling chamber for the desired wrapping of the formed bale, the actuator 60 is once again operated to adopt the extended position of FIG. 10 (step 208). This causes the duck bill applicator 40 to be rotated towards the ready position of FIG. 10. This further increases the path of the wrapping material between the reservoir 20 and the wrapping material inlet 6 greatly increasing the tension in the wrapping material for the cutting operation.

Further, with the actuator 60 in the extended position, the tensioning element 70 causes the braking element 30 to exert the greatest braking force on the roll 12 of wrapping material.

Movement of the duck bill applicator 40 also causes movement of the pivot bar on which the cutting element 80 is mounted, such that force exerted by the biasing element 86 causes the cutting element 80 to be driven clockwise and the cutting knife 84 to be driven across the path of the wrapping material between the duck bill applicator 40 and the wrapping material inlet 6. This severs the wrapping material.

Figure 1:
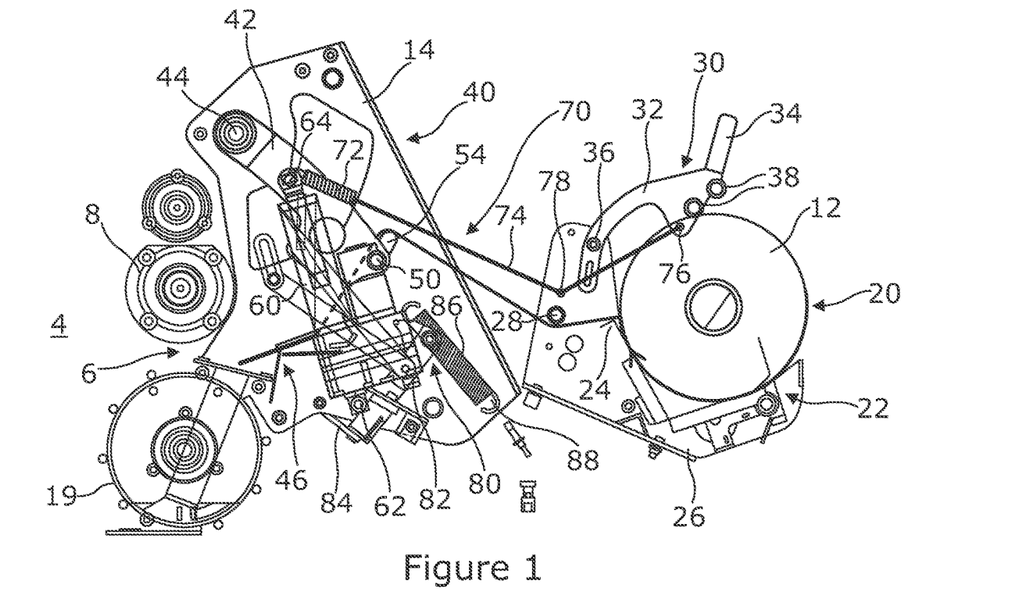
FIG. 1 shows a schematic side view of elements of a baler in accordance with the invention, the elements being in a first position in which a roll of wrapping material is relatively unconsumed.
Figure 2:
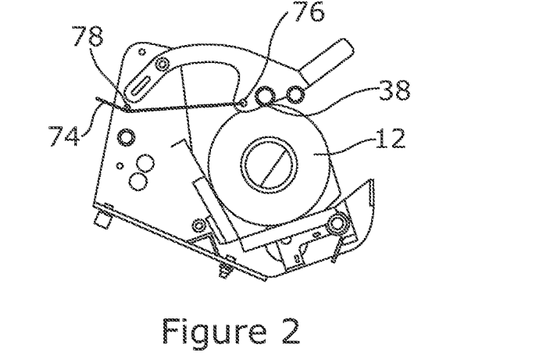
FIG. 2 shows a schematic side view of the wrapping material support and braking device of FIG. 1, in which the roll of wrapping material is approximately half consumed.
Figure 3:
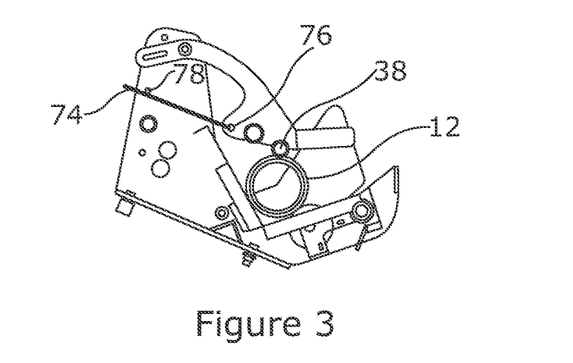
FIG. 3 shows a schematic side view of the wrapping material support and braking device of FIG. 1, in which the roll of wrapping material is almost completely consumed.
Figure 4:
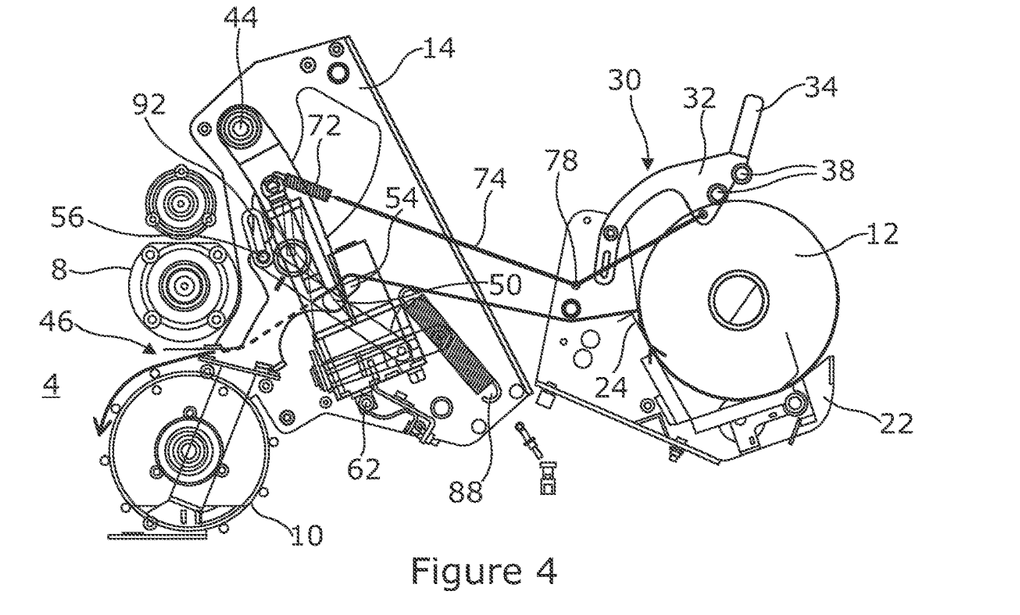
FIG. 4 shows a schematic side view of elements of a baler in accordance with the invention, the elements being in a second position in which the roll of wrapping material is relatively full.
Figure 5:
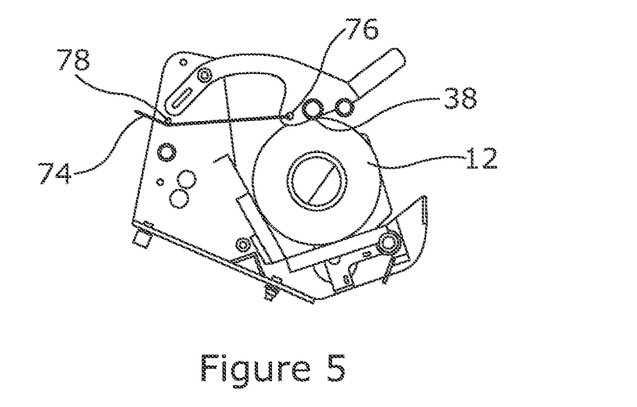
FIG. 5 shows a schematic side view of the wrapping material support and braking device of FIG. 4, in which the roll of wrapping material is approximately half consumed
Figure 6:
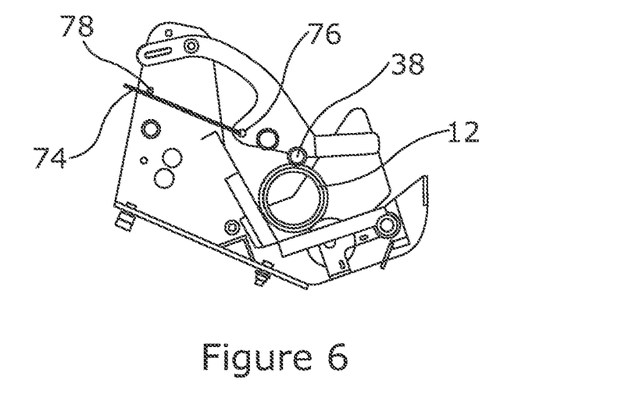
FIG. 6 shows a schematic side view of the wrapping material support and braking device of FIG. 4, in which the roll of wrapping material is almost completely consumed.
Figure 7:
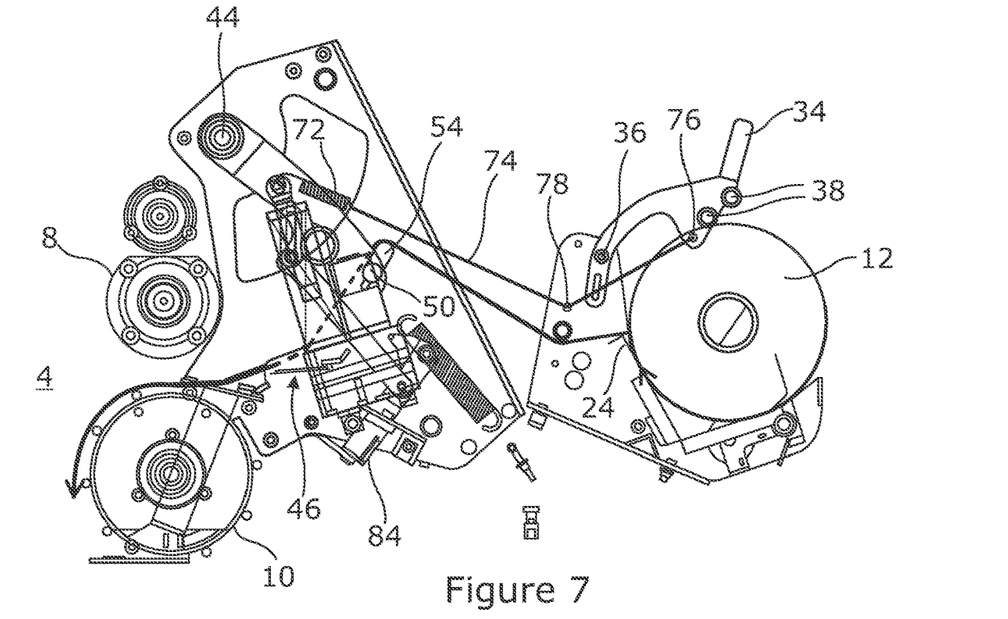
FIG. 7 shows a schematic side view of elements of a baler in accordance with the invention, the elements being in a third position in which the roll of wrapping material is relatively unconsumed.
Figure 8:
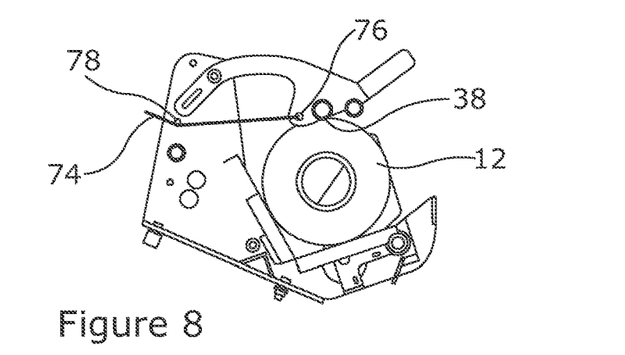
FIG. 8 shows a schematic side view of the wrapping material support and braking device of FIG. 7, in which the roll of wrapping material is approximately half consumed.
Figure 9:
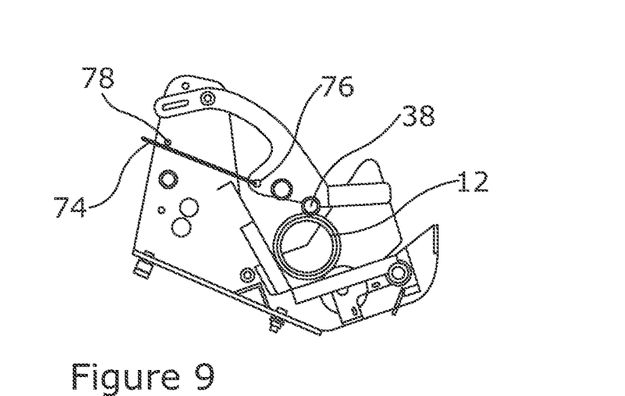
FIG. 9 shows a schematic side view of the wrapping material support and braking device of FIG. 7, in which the roll of wrapping material is almost completely consumed.

As the wrapping material is consumed, the diameter of the roll 12 of binding material reduces. The tensioning element 70 of the present invention has as an advantage that due to the constrained movement of the tensioning element 70 (cable 74) by the guide element 78 in use the pressure exerted by the braking element 30 due to the tensioning element 70 at the stages of wrapping of the bale is increased as the diameter of the roll 12 of binding material reduces thereby allowing maintenance of the desired degree of tensioning of the wrapping material throughout the useful life of the roll of wrapping material (as illustrated by FIGS. 2 and 3 in relation to FIG. 1, FIGS. 5 and 6 in relation to FIG. 4 and so on).

This arrangement has a further advantage. When it is desired to replace a consumed roll of wrapping material with a fresh roll of wrapping material an operator using the handle 34 rotates the braking element 30 about the pivot bar 36 (anticlockwise in the Figures). The tension in the tensioning element 70 is such as to hold the braking element 30 away from the tray 22 (due to the relative position of the mounting point 76 and guide element 78) while the old roll of wrapping material is exchanged for the new). Once the new roll 12 of wrapping material is in position, the operator rotates the braking element 30 back into position such that the rollers 38 once again push down on the roll 12 of wrapping material.

Figure 16:
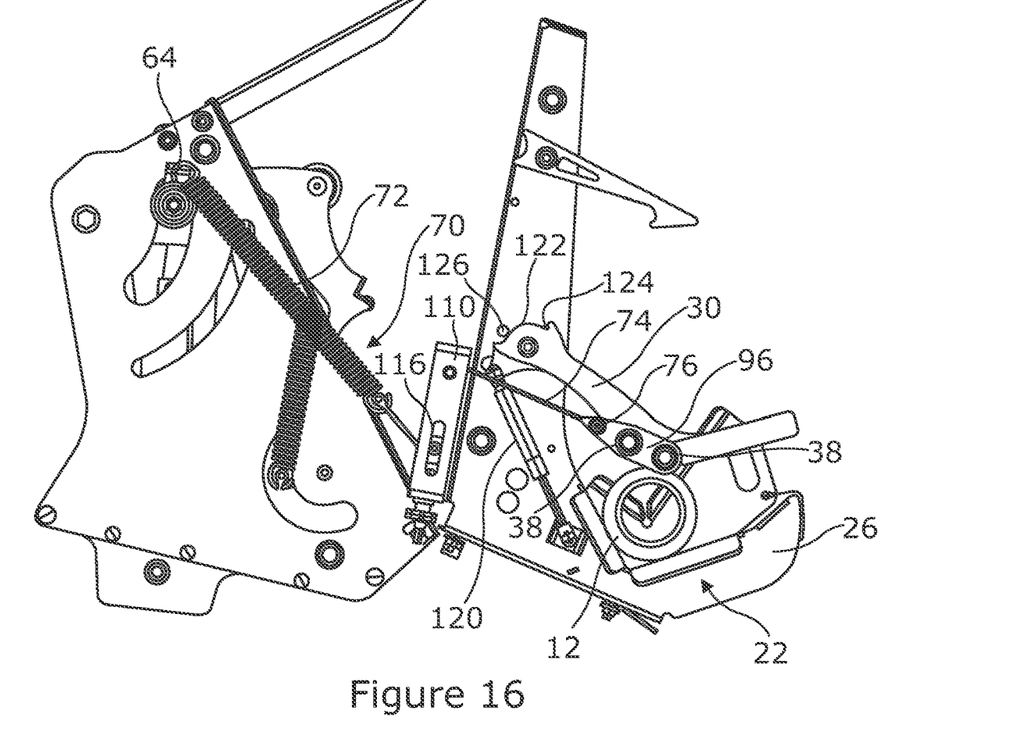
FIG. 16 shows of elements of a baler in accordance with a further embodiment of the invention in which the roll of wrapping material is almost completely consumed.
Figure 17:
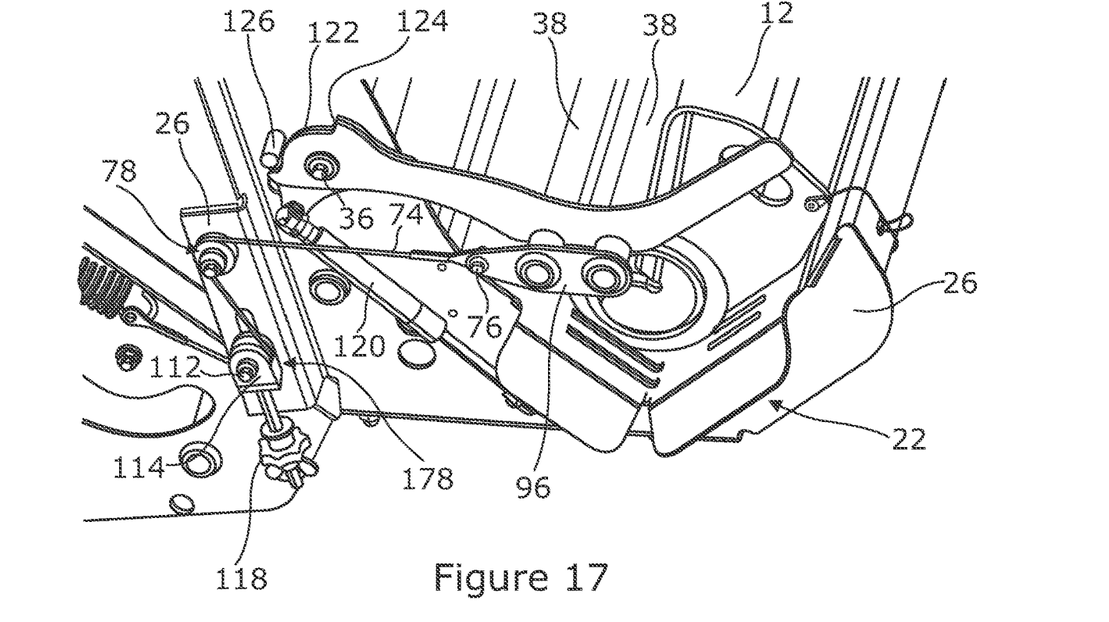
FIG. 17 shows a detail of FIG. 16 from a different angle with several elements removed for clarity.

FIGS. 16 and 17 show a further embodiment in which a further arrangement for constraining the path of the tensioning element 70 between the mounting 64 and a modified barking element 30. The braking element 30 is substantially similar to that of previous embodiments save that at an elongate element 96 is provided on the side elements 32 of the frame of the braking element to support the rollers 38. The mounting point 76 is provided on the elongate element 96 in order to connect the second end of the tensioning element 70 is to the braking element 30. The guide element 78 in the form of a first pulley provided on a part of the support 26 is supplemented by a second guide element 178 in the form of a second pulley such that the cable 74 follows a sinuous path around the first and second pulleys. In use a cover plate 110 is provided to prevent ingress of environmental contaminants such as loose cut crop.

The second guide element 178 is mounted about an axle 112 held in a substantially U-shaped bracket 114 and extending through elongate apertures 116 provided in each of the support 26 and the cover plate 110. The bracket 114 is itself adjustable by way of a screw threaded member 118. By adjusting the separation of the first and second pulleys using the screw threaded member 118 an operator can obtain a degree of control of the braking tension and adjust for the quality/robustness of the wrapping material being used.

The braking element 30 is provided in the region of the pivot bar 36 with a cammed surface 122 terminating at either end with shoulders 124. The cammed surface 122 cooperates with a stop 126 provided on the support 26. The stop 126 together with the shoulders 124 defines the extremes of movement of the braking element 30 between at one end allowing release of the braking element 30 to allow loading of fresh roll of wrapping material and at the other end retaining the hollow tube of an exhausted roll of wrapping material within the tray 22.

A gas spring 120 or similar may also be provided between the support 26 and the braking element 30. This is of use in protecting the operator when engaging/disengaging the system when unloading an exhausted tube of wrapping material and loading of a replacement roll of wrapping material, so that the force needed to displace the braking element 30 is not extreme or harmful to the operator.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A round baler comprising:
a baling chamber;
a wrapping material reservoir;
a feed apparatus to convey a wrapping material from a roll of wrapping material installed in the wrapping material reservoir to the baling chamber;
a cutting apparatus moveable between a retracted position allowing free movement of the wrapping material, and an advanced position to cut the wrapping material;
a braking apparatus for applying a braking force on the roll of wrapping material installed in the wrapping material reservoir;
an actuator for controlling operation of the feed apparatus and the cutting apparatus;
a tensioning element connecting the actuator to the braking apparatus;
wherein at a commencement of a wrapping operation, the actuator is in a first position such that the braking element exerts a first braking force on the roll of wrapping material installed in the wrapping material reservoir;
wherein during feeding of the wrapping material into the baling chamber, the actuator is in a second position such that the braking element exerts a second braking force lower than the first braking force on the roll of wrapping material, and
wherein when the wrapping material is being cut, the actuator is in a third position such that the braking element exerts a third braking force higher than the first braking force on the roll of wrapping material installed in the wrapping material reservoir.

2. The round baler of claim 1, wherein the tensioning element comprises an extensible tensioning element.

3. The round baler of claim 1, wherein the tensioning element comprises a first elastically deformable element and a second inextensible element.

4. The round baler of claim 1, further comprising a guide element between the actuator and the braking apparatus by which the tensioning element is directed from the actuator to the braking apparatus.

5. The round baler of claim 4, wherein the braking apparatus comprises a lever adapted to pivot about a pivot axis.

6. The round baler of claim 5, wherein the guide element is located lower than the pivot axis.

7. The round baler of claim 5, wherein the guide element takes the form of a bounded region.

8. The round baler of claim 5, wherein the guide element takes the form of a grooved bearing or pulley.

9. The round baler of claim 1, further comprising a sensor configured to detect a size of a bale being formed in the baling chamber.

10. The round baler of claim 9, wherein when the size of the bale being formed in the baling chamber reaches a predetermined size, the actuator adopts a position to advance the cutting apparatus from the retracted position towards an intermediate position between the advanced and retracted positions.

11. The round baler of claim 1, wherein the actuator is electric, hydraulic or mechanical.

12. A baling apparatus comprising an agricultural vehicle and the round baler of claim 1.

13. The baling apparatus of claim 12, further comprising a controller.

14. The baling apparatus of claim 13, wherein the controller receives signals for determining progress of the wrapping operation and generates signals to control operation of the actuator.

15. The baling apparatus of claim 14, wherein the signals for determining progress of the wrapping operation represent a time of operation of the wrapping operation or a number of rotations of the baling chamber during the wrapping operation.

16. A method of wrapping a round bale, the round baler having a baling chamber, a wrapping material reservoir, a feed apparatus to convey a wrapping material from a roll of wrapping material installed in the wrapping material reservoir to the baling chamber, a cutting apparatus moveable between a retracted position allowing free movement of the wrapping material, and an advanced position to cut the wrapping material, a braking apparatus for applying a braking force on the roll of wrapping material installed in the wrapping material reservoir, an actuator for controlling operation of the feed apparatus and the cutting apparatus, wherein the method comprises:
adopting a first position of the actuator at a commencement of a wrapping operation such that the braking element exerts a first braking force on the roll of wrapping material;
adopting a second position of the actuator during feeding of the wrapping material into the baling chamber such that the braking element exerts a second braking force lower than the first braking force on the roll of wrapping material; and
adopting a third position of the actuator when cutting the wrapping material such that the braking element exerts a third braking force higher than the first braking force on the roll of wrapping material.

* * * * *